F. H. MIELKE.
THRESHER FEEDER ATTACHMENT.
APPLICATION FILED AUG. 28, 1909.
986,302.
Patented Mar. 7, 1911.
3 SHEETS—SHEET 1.
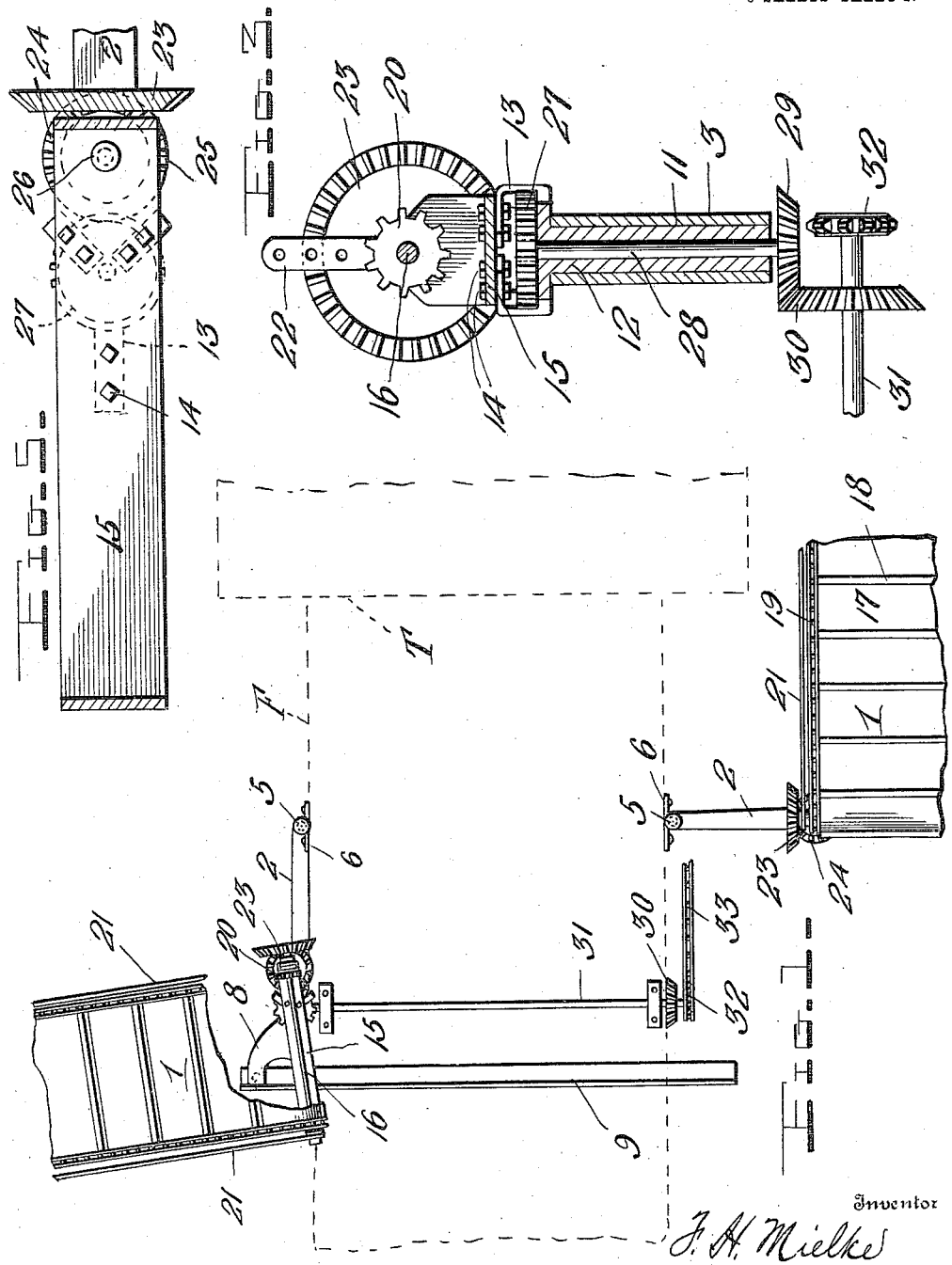
Witnesses
Chas. L. Griesbauer.
E. M. Ricketts
Inventor
F. H. Mielke
By Watson E. Coleman
Attorney

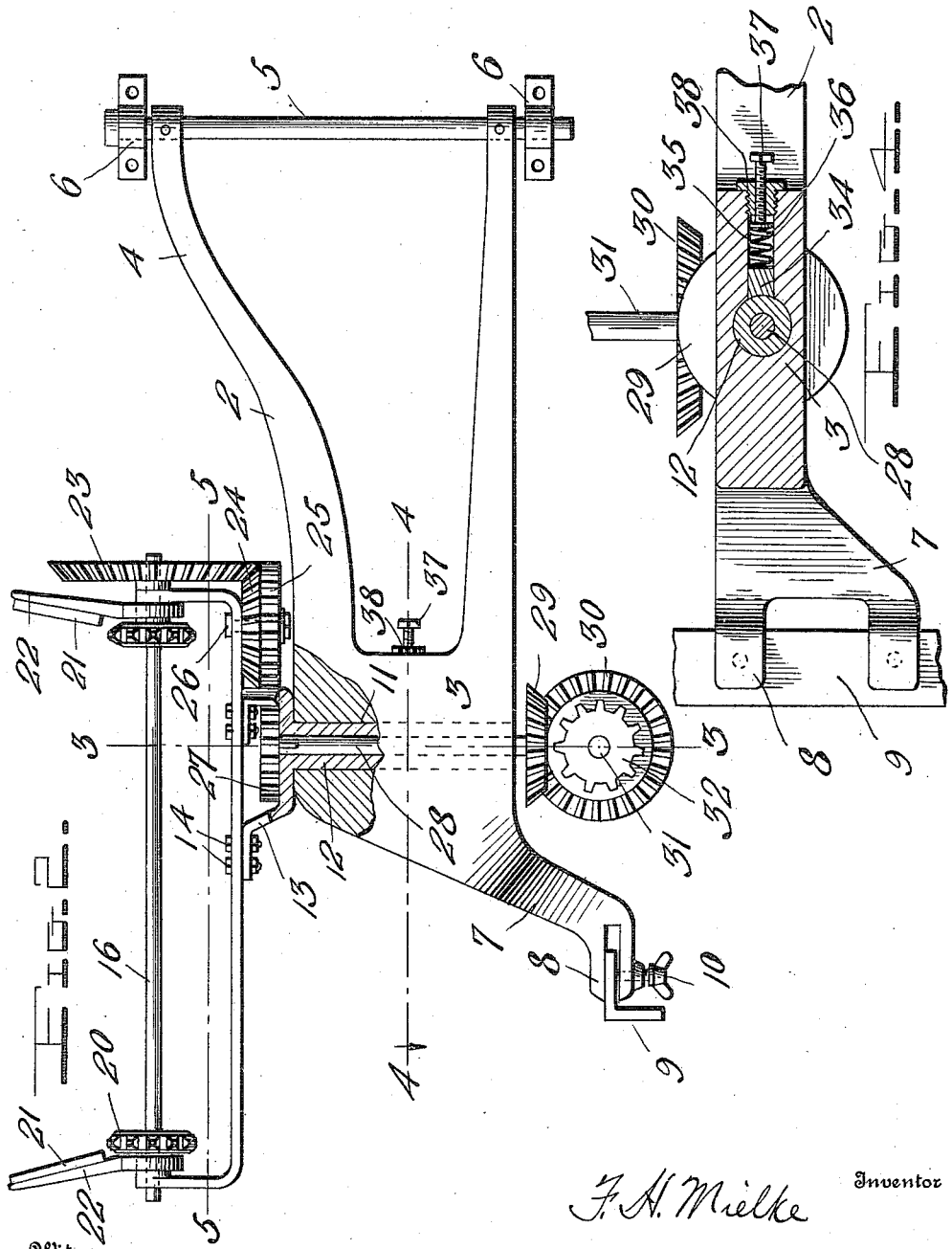
F. H. MIELKE.
THRESHER FEEDER ATTACHMENT.
APPLICATION FILED AUG. 28, 1909.
986,302.
Patented Mar. 7, 1911.
3 SHEETS—SHEET 2.

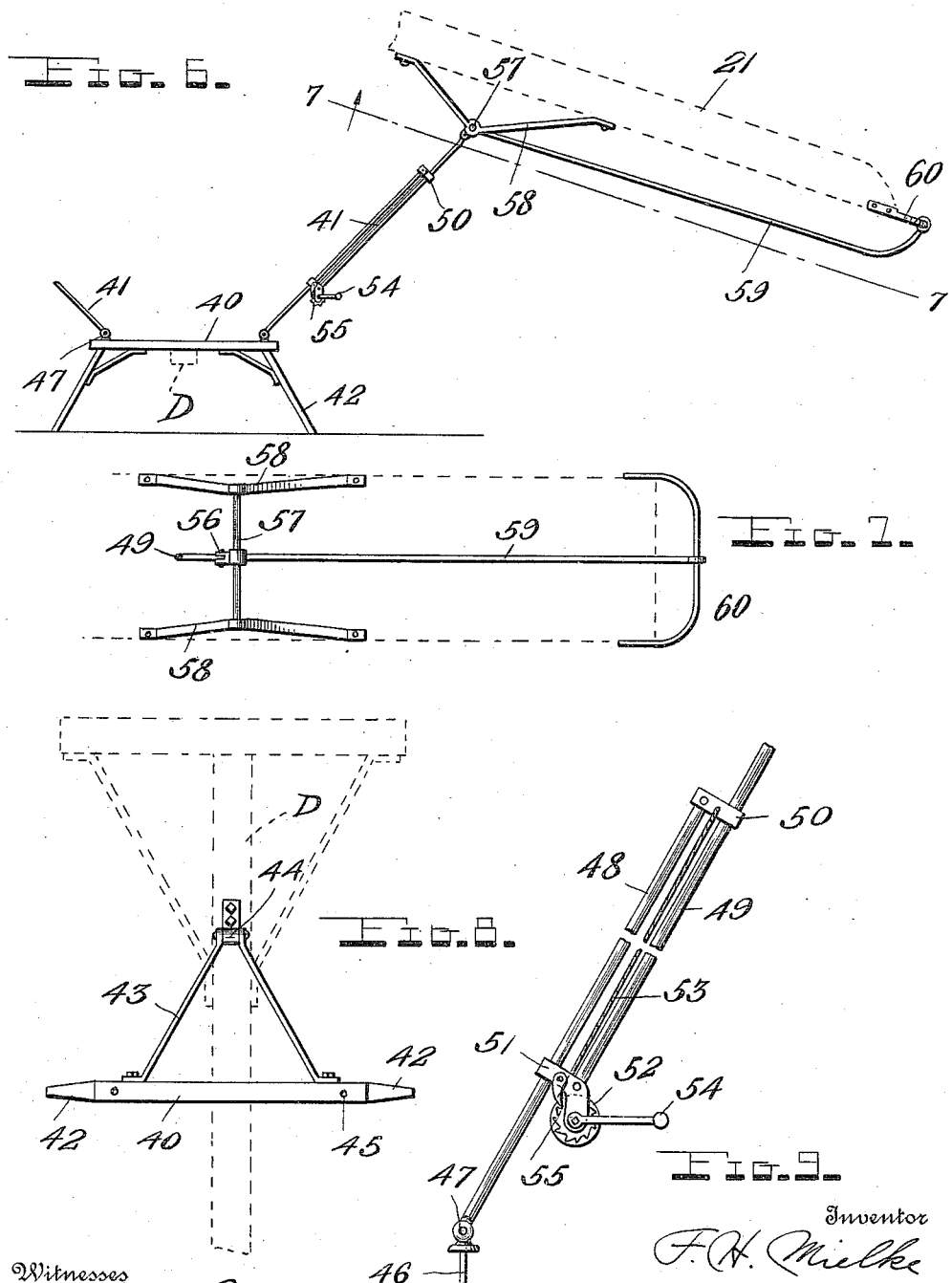

UNITED STATES PATENT OFFICE.

FREDERICK H. MIELKE, OF HARTFORD, SOUTH DAKOTA.

THRESHER FEEDER ATTACHMENT.

986,302.            Specification of Letters Patent.      Patented Mar. 7, 1911.

Application filed August 28, 1909. Serial No. 515,045.

*To all whom it may concern:*

Be it known that I, FREDERICK H. MIELKE, a citizen of the United States, residing at Hartford, in the county of Minnehaha and State of South Dakota, have invented certain new and useful Improvements in Thresher Feeder Attachments, of which the following is a specification, reference being had to the accompanying drawings.

This invention is an improved bundle or grain elevating attachment for the self feeders of threshing machines.

The object of the invention is to provide an improved support and bearing for a lateral feeder used in connection with the ordinary self feeder of a threshing machine, whereby such lateral feeder may be readily swung into and out of gear and when swung out of gear may be moved to an out-of-the-way position alongside or above the thresher or its self feeder.

With the above and other objects in view, the invention consists of the novel features of construction and the combination and arrangement of parts hereinafter fully described and claimed, and illustrated in the accompanying drawings, in which—

Figure 1 is a plan view of the invention with parts broken away and with the thresher feeder and thresher indicated in dotetd lines; Fig. 2 is a side elevation, partly in section, of the invention; Fig. 3 is a detail vertical section taken on the plane indicated by the line 3—3 in Fig. 2; and Figs. 4 and 5 are horizontal sections taken, respectively, on the planes indicated by the lines 4—4 and 5—5 in Fig. 2. Fig. 6 is a side elevation of an adjustable supporting device for the outer end of the lateral feeder. Fig. 7 is a sectional view taken on the plane indicated by the line 7—7 in Fig. 6. Fig. 8 is a plan view of the supporting trestle, and Fig. 9 is a detail view showing the adjustable supporting member.

In the preferred embodiment of the invention illustrated in Fig. 1, I employ two lateral feeders 1 and arrange them on opposite sides of the self feeder F so that they can swing toward and from the latter. Each of these lateral feeders is supported at its upper end by means of a swinging hanger or bracket 2 preferably in the form of a casting, as shown more clearly in Fig. 2 of the drawings. This hanger 2 has an enlarged body portion 3 from one side of which extends two spaced and diverging arms 4 formed with vertically alined openings to receive an upright pivot 5, to which latter they are suitably secured. The pivot 5 is in the form of a cylindrical rod rotatable in upper and lower bearing brackets 6 secured to one of the sides of the feeder F. From the opposite side of the body portion 3 of the hanger projects in a downward direction, an arm 7, the lower end of which is bifurcated to provide two notched or recessed portions 8 adapted to receive one flange of an angle metal cross bar 9 secured to the bottom of the feeder F and having its ends projecting, as will be understood on reference to Fig. 1. The bar 9 serves as an anchoring member, and while it is preferably constructed as shown it may be of other shape and construction. Set screws 10 are arranged in the portions or arms 8 to securely clamp the hanger 2 in engagement with the supporting bar or anchoring member 9. Formed in the body portion 3 of the hanger 2 is a upright bearing opening 11 to receive a turn table 12 preferably in the form of a casting consisting of a bored cylindrical pivot portion which is rotatable in the opening 11 and which has formed at its top three upwardly projecting arms 13 which are bolted, as shown at 14, to a U-shaped bracket 15. The upturned ends of the latter form bearings for the upper driving shaft 16 of one of the lateral feeders 1, each of which latter is of the usual form consisting of an apron 17 having cross slats 18 and united to sprocket chains 19, which latter pass around sprocket wheels 20 on the shaft 16 and also around similar sprocket wheels on a similar shaft journaled in the lower end of the frame of the feeder 1. As illustrated, said frame of the feeder 1 consists of side boards or members 21 secured to bracket members 22 arranged on the shaft 16 within the upright portions of the bracket 15 but it may be of other form and construction and its lower end may be supported by any suitable means. Fixed to one end of the shaft 16 is a beveled gear 23 which meshes with a beveled gear 24 integral with a cog gear 25 and journaled on an upright stub shaft 26 depending from the bracket 15. The gear 25 meshes with a similar gear 27 fixed to the upper end of a vertical shaft 28 rotatable in the bore or opening of the turn table 12. Upon the lower end of the shaft 28 is a beveled gear 29 adapted to be swung into mesh with a beveled gear 30 fixed adjacent to one of the ends of a transverse shaft 31 journaled in bearings on the bottom of the feeder F. On one end of the shaft 31 is provided a sprocket wheel 32 adapted to be connected by a chain wheel 33 to a sprocket wheel on one of the rotating shafts of the feeder or the thresher. Owing to this arrangement of gearing and the provision of the turn table 12, it will be noted that the lateral feeder 1 may be swung vertically with the shaft 16 as its pivot as well as horizontally with the turn table 12 as its pivot. It will also be noted that the mounting of the hanger 2 permits the lateral feeder to be swung horizontally to move the gear 29 out of mesh with the gear 30 and also to dispose said lateral feeder alongside of the feeder or above the same or the thresher and in an out-of-the-way position.

In order to prevent the turn table 12 from casually shifting a tension device is preferably employed. This device consists of a friction or brake block 34 slidably arranged in a recess 35 formed in the body portion 3 of the hanger and adapted to bear against the upright tubular pivot portion of said turn table. Arranged in the recess 35 in rear of the block 34 is a coil spring 36, the tension of which may be varied by means of a screw 37 arranged in a screw plug 38 which closes the outer end of the recess 35.

In Figs. 6 to 9 inclusive of the drawings I have shown an adjustable supporting means for the outer end of the lateral feeder, or feeders. This supporting means comprises a trestle 40 mounted on the draft tongue or pole D of the thresher and having detachably connected to it longitudinally extensible supporting members or braces 41, which latter are connected to the lateral feeders by means of braces and connecting rods. The trestle 40 comprises a main bar disposed transversely with respect to the tongue D and having at its ends supporting legs 42 adapted to rest upon the ground when the trestle is in an operative position. Said body bar of the trestle has connected to it rearwardly converging pivot straps 43 which are pivoted to a bearing plate 44 secured on the tongue D whereby said trestle when not in use may be swung over in a rearward direction upon the extreme rear or inner part of the tongue, in which position it will be out of the way. The ends of the body bar of the trestle are formed with openings or sockets 45 to removably receive the vertical pivot pins 46 having enlarged upper ends or heads, in which latter are mounted on horizontal pivots 47 the lower ends of the extensible braces or members 41. Each of the latter consists of two parallel bars or rods 48, 49, the adjacent ends of which overlap as shown in Fig. 9. Fixed to the upper end of the lower bar 48 is a stationary head 50 through which the upper bar 49 slides, and fixed to the lower end of the bar 49 is a head 51 which slides upon the lower bar 48. A head 51 has journaled upon it a windlass 52 for a cable or cord 53, the free end of which is secured to the head 50. The windlass is provided with a crank handle 54 and a pawl and ratchet locking device 55. It will be seen that when the crank 54 is turned to wind the cable upon the windlass, the bar 49 will be moved upwardly and outwardly on the bar 48. The upper extremity of the bar 49 is pivoted at 56 to a cross rod 57 uniting two angular brackets 58 which is secured to the bottom edges of the side boards or plates of one of the lateral feeders 21. The cross rod 57 has connected to it one end of a longitudinal rod 59, the other end of which latter is secured to a longitudinally curved bracket or brace 60 connecting the outer ends of the side boards or plates of the feeder 21, as clearly shown in Figs. 6 and 7. The longitudinal rod or bar 59 is spaced below the bottom portion of the lateral feeder so as to form a guard for the endless belt or conveyer. Owing to the construction above described it will be seen that the lateral feeder will be permitted to be moved and adjusted at any elevation and at any angle with respect to the thresher and its feeder.

Having thus described the invention what is claimed is:

1. In a device of the character described, the combination of a support, an upright pivot carried thereby, an anchoring bar, a horizontally swinging hanger mounted on said pivot and having a bifurcated arm adapted to receive said anchoring bar, a clamping screw arranged in said bifurcated arm to engage said anchoring bar, and a lateral feeder carried by said hanger.

2. In a device of the character described, the combination of a support, an upright pivot on said support, a horizontally swinging hanger supported by said pivot, a turn table having an upright tubular pivot rotatable in said hanger and provided at its upper end with upwardly projecting bracket arms, a U-shaped bracket secured to said arms, a lateral feeder including a frame and a drive shaft, the frame being adapted to swing from the drive shaft and said drive shaft being rotatable in bearings on said U-shaped bracket, an upright shaft in the tubular portion of said turn table, driving gearing between the upper end of the upright shaft and one end of the other shaft, and a driving means at the lower end of said upright shaft.

3. In a device of the character described, the combination of an upright pivot, a horizontally swinging member mounted on said pivot and formed with a vertically extending bore, and a horizontal communicating opening, the outer end of the last mentioned opening being screw threaded, a turn table having a tubular upright portion rotatable in the said bore in the hanger, an upright shaft in said tubular portion of the turn table, a lateral feeder carried by the turn table and driven from said upright shaft, a friction block slidable in the horizontal opening in the hanger and adapted to bear against the tubular portion of the turn table, a screw plug in the threaded outer end of said horizontal opening, said plug being formed with a threaded bore, an adjusting screw in the threaded bore of said plug, and a coil spring in said horizontal opening between said friction block and the inner end of said screw.

4. In a device of the character described, the combination of an upright pivot, an anchoring member, a horizontally swinging hanger supported by said pivot, a clamping means carried by said hanger to engage the anchoring member, a turn table having an upright tubular pivot portion rotatable in said hanger, a shaft in said pivot portion of the turn table, a lateral feeder carried by said turn table, driving means for said feeder geared to said shaft, a drive shaft and gears upon the two shafts and adapted to be moved into and out of mesh with each other by reason of the swinging movement of the hanger.

5. In a device of the character described, the combination of a hanger mounted for swinging movement, means for anchoring said hanger, a turn table carried by said hanger, a lateral feeder carried by said turn table, a vertical drive shaft upon the turn table for said feeder, means for imparting the motion of said drive shaft to said feeder, a horizontally disposed main drive shaft and gears upon said shafts and adapted to be moved into and out of mesh with each other by reason of the swinging movement of said hanger.

6. In a device of the character described, the combination with a lateral feeder including side members, a frame beneath the lateral feeder and including a transverse rod mounted in hangers on the side members of the feeder, and a longitudinal rod secured at one end to said transverse rod and having its other end secured to a transverse bracket at one end of the feeder, a trestle, and a longitudinally extensible supporting member between the trestle and said transverse rod.

7. In a device of the character described, the combination of a lateral feeder, a trestle having a body bar carrying supporting legs, means pivotally connecting the trestle to the draft tongue of a thresher so as to permit the trestle to swing over on the rear portion of the tongue, and a supporting brace member between the feeder and said trestle.

8. In a device of the character described, the combination of a lateral feeder, a bearing adapted to be secured to the draft tongue of a thresher, a trestle consisting of a bar and supporting legs secured thereto, one end of said bar being formed with a bearing opening, links secured to said bar and pivotally connected to said bearing whereby the trestle may swing over on the tongue, a supporting brace member having its upper end pivotally connected to the feeder, and a pivot pin pivotally connected to the lower end of said member and removably and rotatably arranged in the opening in the bar of the trestle.

9. In a device of the character described, the combination of a lateral feeder, angular brackets on opposite sides of the feeder, a cross rod connecting said brackets, a transverse bracket at the outer end of the feeder, a longitudinal rod connecting said cross rod to the last mentioned bracket, a supporting brace connected to said cross rod, and means for mounting said brace.

In testimony whereof I hereunto affix my signature in the presence of two witnesses.

FREDERICK H. MIELKE.

Witnesses:
C. MATTHIER,
F. DERKER.

---

Copies of this patent may be obtained for five cents each, by addressing the "Commissioner of Patents, Washington, D. C."